US010298813B2

(12) United States Patent
Sprigg et al.

(10) Patent No.: US 10,298,813 B2
(45) Date of Patent: *May 21, 2019

(54) HIGH RESOLUTION TURBULENCE FREE IMAGING

(71) Applicant: University of Maryland Baltimore County, Baltimore, MD (US)

(72) Inventors: Jane Sprigg, Baltimore, MD (US); Ian Tolfree, Baltimore, MD (US); Yanhua Shih, Baltimore, MD (US)

(73) Assignee: University of Maryland Baltimore County, Baltimore, MD (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/449,756

(22) Filed: Mar. 3, 2017

(65) Prior Publication Data

US 2018/0255212 A1    Sep. 6, 2018

(51) Int. Cl.
*H04N 5/217*    (2011.01)
*H04N 5/33*    (2006.01)
*G03B 15/00*    (2006.01)
*G06T 5/00*    (2006.01)
*G06T 5/50*    (2006.01)
*G06T 7/246*    (2017.01)

(52) U.S. Cl.
CPC ......... *H04N 5/2173* (2013.01); *G03B 15/006* (2013.01); *G06T 5/003* (2013.01); *G06T 5/50* (2013.01); *G06T 7/248* (2017.01); *H04N 5/217* (2013.01); *H04N 5/33* (2013.01); *G03B 2217/005* (2013.01); *G06T 2207/10016* (2013.01); *G06T 2207/10032* (2013.01); *G06T 2207/10048* (2013.01); *G06T 2207/20216* (2013.01)

(58) Field of Classification Search
CPC ........ H04N 5/2173; H04N 5/33; G06T 7/248; G06T 5/003; G06T 5/50; G06T 2207/10016; G06T 2207/10032; G06T 2007/10048; G06T 2007/20216; G03B 15/006
USPC ............................ 382/274; 348/147, 207.99
See application file for complete search history.

(56) References Cited

U.S. PATENT DOCUMENTS

| 8,488,961 B2 * | 7/2013 | Yoshida | G01M 11/336 398/147 |
| 8,532,427 B2 * | 9/2013 | Meyers | G06T 5/50 382/272 |
| 9,727,959 B2 * | 8/2017 | Meyers | G06T 5/007 |

* cited by examiner

Primary Examiner — Trang U Tran
(74) Attorney, Agent, or Firm — Juneau & Mitchell; Todd Juneau

(57) ABSTRACT

A camera and imaging method with nonclassical imaging resolution, for applications in long-distance imaging, such as satellite and aircraft-to-ground based distant imaging, utilizing an intensity-fluctuation correlation measurement of thermal light.

24 Claims, 9 Drawing Sheets

FIGURE 2
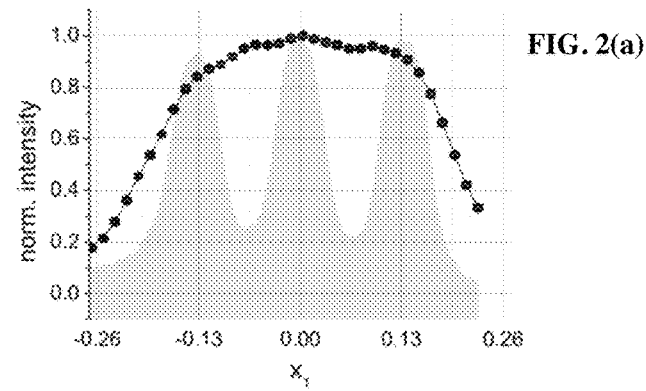
FIG. 2(a)
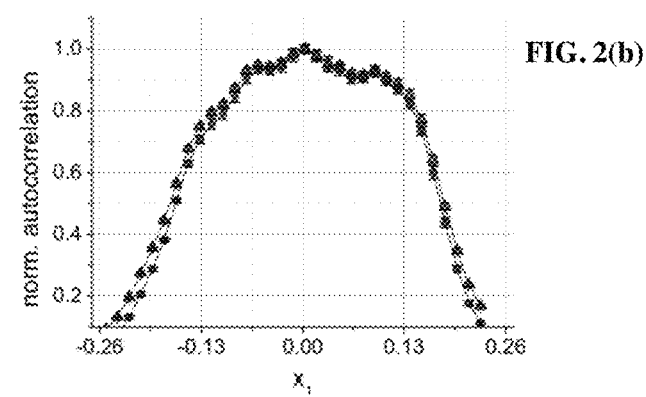
FIG. 2(b)
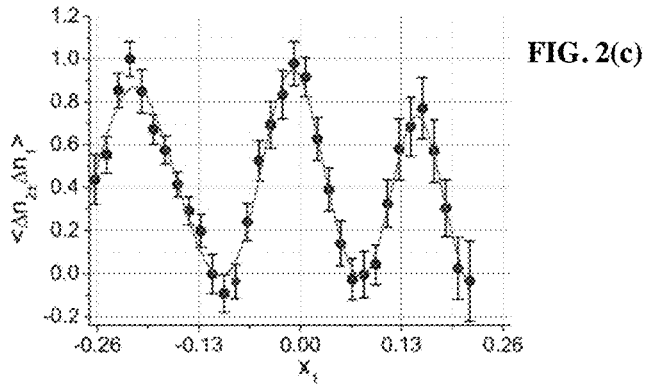
FIG. 2(c)
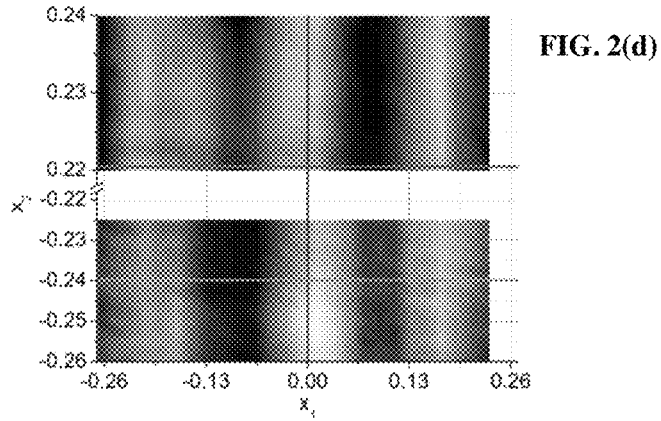
FIG. 2(d)

HIGH RESOLUTION TURBULENCE FREE IMAGING

CROSS-REFERENCE TO RELATED APPLICATIONS

Provided per USPTO rules by Application Data Sheet

STATEMENT REGARDING FEDERALLY SPONSORED RESEARCH

Provided per USPTO rules by Application Data Sheet.

NAMES OF PARTIES TO A JOINT RESEARCH AGREEMENT

Provided per USPTO rules by Application Data Sheet.

REFERENCE TO SEQUENCE LISTING

Provided per USPTO rules by Application Data Sheet

STATEMENT REGARDING PRIOR DISCLOSURES BY INVENTOR

Provided per USPTO rules by Application Data Sheet

BACKGROUND OF THE INVENTION

Field of the Invention

The invention relates to a camera system for applications in long-distance imaging, such as satellite and aircraft-to-ground based distant imaging, where the camera provides turbulence free nonclassical imaging resolution that uses an intensity-fluctuation correlation measurement of thermal light, where the imaging method uses higher order correlation of light to provide a high image resolution, and in particular, use a higher order correlation of light in conjunction with a "ghost imaging" detection scheme using two or more detectors, where one detector correlates the high frequency spatial Fourier transform of an unresolved image with the unresolved image recorded at the other detector, wherein a higher resolution image is observed in the correlated fluctuations of intensity of the two detectors.

Description of Related Art

It is believed that the HBT effect is a two-photon interference phenomenon: a pair of random distributed and random radiated photons interferes with the pair itself. The two-photon interference "forces" the random photon pair to be correlated in transverse position, i.e., if one photon is observed at a position the other one has 50% more chance to be observed at a unique position simultaneously.

The HBT effect eventually spurred research into imaging technologies that take advantage of the point-to-point intensity correlation. Traditional imaging technology is based on a point-to-point correlation between the object plane and the image plane, namely the image-forming function: light coming from a point of the object plane can only be "seen" at a unique point on the image plane. However, if a random pair of photons has 50% more chance to be observed at a point of the object plane and simultaneously at a unique point on a distant plane, namely the image plane, an image of the object will be obtained from a coincidence measurement of the photon pair. This technique produces an image of an object by combining information from two photodetectors: a conventional, multi-pixel detector that does not view the object (usually a CCD camera), and a "bucket" single pixel detector that does view the object, however, cannot distinguish light that coming from different points of the object.

A 1995 article by Pittman, Shih, Strekalov, Sergienko, "Optical imaging by means of two-photon quantum entanglement," Phys. Rev. A 52 (1995), R3429, incorporated herein in its entirety, was not using thermal light. These experiments measured the coincidence of a quantum mechanically entangled photon pair, referred to as the signal and idler photon, respectively. The signal-idler pair has 100% chance to be located at a pair of two positions. In these experiments, after passing a lens, the signal photon either hit or passed through an object and then was detected by a bucket detector that measured only whether, but not where, the signal photon hit. At the same time, the idler photon propagated from the source directly to a CCD camera that recorded the actual position the idler photon hit. The coincidence counting rates between the bucket detector and the CCD camera were then recorded by a personal computer pixel by pixel. A 100% contrast image of the object was then observed from the coincidences.

In 2004, thermal light imaging was demonstrated by using randomly paired photons, instead of entangled photon pairs. The first a few publications includes: (1) A. Valencia, G. Scarcelli, M. D'Angelo, and Y. H. Shih, "Two-photon Imaging with Thermal Light", Rev. Lett., 94, 063601 (2005); (2) G. Scarcelli, V. Berardi and Y. H. Shih, "Can Two-Photon Correlation of Chaotic Light Be Considered as Correlation of Intensity Fluctuation?" . Rev. Lett., 96,063602(2006); (3) R.E. Meyers, K.S. Deacon, and Y.H. Shih, "Ghost Imaging Experiment by Measuring Reflected Photons", . Rev. A 77, Rapid Comm.,041801(2008). These articles are incorporated herein in its entirety. In the thermal light random-pair imaging experiments, a photon either hit or passed through an object and then was detected by a bucket detector that measured only whether, but not where, that photon hit. At the same time, its random partner propagated from the source directly to a CCD array that recorded the actual position the photon hit. The CCD is placed at a distance from the light source that equals the distance between the light source and the object. The coincidence counting rates between the bucket detector and the CCD camera were then recorded by a personal computer pixel by pixel. A 50% contrast image of the object was then observed from the coincidences.

In 2011, an HBT intensity correlation was discovered, and two-photon imaging was discovered to be naturally turbulence-free. The published article by R.E. Meyers, K.S. Deacon, and Y.H. Shih, "Turbulence-free Ghost Imaging", Applied Phys. Lett., 98,111115(2011), is incorporated herein in its entirety.

The imaging resolution of a classical camera is limited by the diameter of its lens, D, and the distance to the object, $s_o$. Mathematically, a classical image, including both coherent and incoherent (thermal) imaging, is the result of the following convolution:

FORMULA 1

$$I(\vec{\rho}_i) = \left| \int d\vec{\rho}_o A(\vec{\rho}_o) e^{\frac{ik}{2s_o}(\rho_o^2 + \rho_i^2/\mu)} \text{somb}\left[\frac{\pi}{\lambda}\frac{D}{s_o}(|\vec{\rho}_o - \vec{\rho}_i/\mu|)\right] \right|^2$$

$$\equiv \left| A(\vec{\rho}_o) e^{\frac{ik}{2s_o}(\rho_o^2 + \rho_i^2/\mu)} \otimes \text{somb}\left[\frac{\pi}{\lambda}\frac{D}{s_o}(|\vec{\rho}_o - \vec{\rho}_i/\mu|)\right] \right|^2$$

where $I(\vec{\rho}_i)$ is the intensity distribution on the image plane; $\vec{\rho}_o$ and $\vec{\rho}_i$ are the transverse coordinates of the object-plane and the image-plane, respectively; $A(\vec{\rho}_o)$ is the aperture function of the object; the sombrero-like function, or Airy disk, $\text{somb}[x] = 2J_1(x)/x$ is the image-forming function, where $J_1(x)$ is the first-order Bessel function. Inside the somb-function, $\lambda$ is wavelength of illumination and $\mu = s_i/s_o$ is the image magnification. For large values of $D/s_o$, the somb-function can be approximated as a $\delta$-function of $|\vec{\rho}_o - \rho_i/\mu|$, which results in perfect point-to-point imaging, i.e., light from an object point $\rho_o$ constructively interferes only at a unique point $\rho_i$ on the image plane. However, when $D/s_o$ is not large enough, it allows a greater range of values of $|\vec{\rho}_o - \rho_i/\mu|$ for the somb-function to reach its zero, resulting in a point-to-spot imaging function; i.e., light from an object point constructively interferes over the area of the spot on the image plane. Obviously, the size of the spot determines the resolution of the convolution and thus the imaging resolution of the camera. We usually use Rayleigh's criterion $\delta x = 1.22 \lambda s_o/D$ to define the resolution of an optical imaging device. For long-distance imaging, a camera needs to have a large enough imaging lens to achieve the expected resolution. Otherwise, the picture will be "blurred" even if the camera has enough "zooming" power for that distance.

Why does a smaller imaging lens lose its ability to distinguish two close points on the object plane? Although light-rays coming from an object point $\rho_o$ may propagate with different directions and thus with different optical paths, a lens forces all of them to travel equal distances to arrive at a unique point $\rho_i$ on the image plane, resulting in constructive interference at that unique image point. Simultaneously, the lens introduces phase delays for light-rays originating from a neighboring object point $\rho_o'$ which are large enough to result in destructive interference. However, a smaller lens may not be able to introduce large enough phase delays among these rays, resulting in in-complete destructive interference between neighboring object points in the image plane. It is this incomplete destructive interference which produces point-to-spot imaging, or partially overlapped images between two neighboring object points, and limits the resolution of an image. We thus consider classical imaging the result of the first-order coherence of light, with an imaging resolution limited by the size of the imaging lens or other mechanisms that limit the ability to achieve complete first-order constructive-destructive interference. It is interesting that the image is produced by constructive interference but its resolution is limited by the destructive interference.

However, there is still a need in the art for additional improvements in the imaging process, improvements in resolution, improvements in data processing, and other improvements, including a camera system that can employ a small lens to take long-distance photographs that can distinguish objects within a small subject area despite atmospheric turbulence.

BRIEF SUMMARY OF THE INVENTION

In a preferred embodiment, there is provided a camera system, comprising: a beam splitter receiving photons from an object or area to be imaged, each such photon passing through the beam splitter to a first photodetector or a second photodetector, wherein the first photodetector passes information to a first fluctuation identifier and the second photodetector passes information to a second fluctuation identifier and each of the first and second fluctuation identifiers pass information to a fluctuation circuit (FC) comprising at least one processor, at least one memory operatively associated with the processor, such memory containing a fluctuation protocol algorithm, and wherein the FC detects photon coincidence from the intensity fluctuation correlation of the thermal light photons, and passes the resulting correlation information to an image viewer.

In preferred embodiments, the photons are either thermal light photons or are sub-Rayleigh reflected radiation photons, or both.

In another preferred embodiment, there is provided a camera system wherein each of the first and second photodetectors are configured to detect electromagnetic radiation in wavelengths selected from the group consisting of: a 100-214 THz (10e12 Hz) short-wave infrared photodetector (SWIR), a 120-400 THz near-IR infrared photodetector (NIR), a 30-120 THz mid-infrared photodetector (MIR), a 37-100 THz medium-wave infrared photodetector (MWIR), a 20-37 THz long-wave infrared photodetector (LWIR), a 0.3-30 THz FIR photodetector, a 300-750 THz visible wavelength photodetector (VIS), and a 700-30,000 THz ultraviolet wavelength photodetector (UV).

In another preferred embodiment, there is provided a camera system wherein each of the first and second photodetectors is selected from the type consisting of: a short-wave infrared photodetector (SWIR), a medium-wave infrared photodetector (MWIR), a long-wave infrared photodetector (LWIR), a visible wavelength photodetector (VIS), and a ultraviolet wavelength photodetector (UV).

In another preferred embodiment, there is provided a camera system wherein the short-wave infrared photodetector is selected from a detector consisting of: an InGaAs (Indium Gallium Arsinide) detector, a quantum dot film detector, a HgCdTe (Mercury Cadmium Telluride) detector, a Strained Layer Superlattice (SLS) detector, and a PbSe (Lead Selenium) detector.

In another preferred embodiment, there is provided a camera system wherein the medium-wave infrared photodetector is selected from a detector consisting of: an nBn (N-type Barrier N-type) detector, an InSb (Indium Tin) detector, a quantum dot film detector, a HgCdTe (Mercury Cadmium Telluride) detector, a Strained Layer Superlattice (SLS) detector, and a PbSe (Lead Selenium) detector.

In another preferred embodiment, there is provided a camera system wherein the long-wave infrared photodetector is selected from a detector consisting of: a HgCdTe (Mercury Cadmium Telluride) detector, and a Strained Layer Superlattice (SLS) detector.

In another preferred embodiment, there is provided a camera system wherein the visible-wavelength photodetector is selected from a detector consisting of: a silicon detector, e.g. CMOS (Complementary Metal Oxide Semiconductor) detector, and a quantum dot film detector.

In another preferred embodiment, there is provided a camera system wherein the ultraviolet-wavelength photodetector is a quantum dot film detector.

In another preferred embodiment, there is provided a camera system wherein the first photodetector and the second photodetector are the same type of photodetector.

In another preferred embodiment, there is provided a camera system wherein the first photodetector and the second photodetector are different types of photodetector.

In another preferred embodiment, there is provided a camera system wherein the first photodetector and the second photodetector are configured on a single photodetector film wherein the first photodetector is a first partition of the single photodetector film, and the second photodetector is a second partition of the single photodetector film.

In another preferred embodiment, there is provided a camera system wherein the information passed from the first photodetector and the second photodetector to the respective fluctuation identifier comprises the registration time of each photodetection event.

In another preferred embodiment, there is provided a camera system wherein the information passed from each fluctuation identifier to the fluctuation circuit comprises counting numbers classified as positive and negative fluctuations.

In another preferred embodiment, there is provided a camera system wherein the fluctuation circuit and associated circuit control and syncing software records the registration time of each photodetection event from the first photodetector and the second photodetector in two independent event timers, which are divided into sequences of short time windows.

In another preferred embodiment, there is provided a camera system wherein the fluctuation circuit and associated circuit control and syncing software analyzes the photon counting number fluctuations in each time window, calculating the average counting numbers per short time window.

In another preferred embodiment, there is provided a camera system having at least one FPGA (Field Programmable Gate Array) in control of the first and second photodetectors for synchronizing the information passed from the first photodetector to the first fluctuation identifier and the information passed from the second photodetector to the second fluctuation identifier.

In another preferred embodiment, there is provided a camera system having at least one ASIC (Application Specific Integrated Circuit) in control of the first and second photodetectors for synchronizing the information passed from the first photodetector to the first fluctuation identifier and the information passed from the second photodetector to the second fluctuation identifier.

In another preferred embodiment, there is provided a camera system wherein the path lengths of the photons incident on the first and second photodetectors are identical and provides turbulence free imaging.

In another preferred embodiment, there is provided a camera system wherein the path length of the photons incident on the first photodetector is at the image plane, and the path length of the photons incident on the second photodetectors at the Fourier plane and provides turbulence free sub-Rayleigh imaging.

In another preferred embodiment, there is provided a camera system wherein the path length of the photons incident on the first and second photodetectors is achieved with mirrors or a high index of refraction material.

In another preferred embodiment, there is provided a camera system wherein the image produced on the image viewer is a series of images comprising a video sequence.

In a preferred method embodiment, there is provided a method of use of the camera system, comprising the following processor implemented steps not necessarily in sequential order:

providing to the first fluctuation identifier a first sample set (S1) of a series of frames from the first photodetector, and providing to the second fluctuation identifier a second sample set (S2) of a series of frames from the second photodetector, wherein the first photodetector is frame synchronized with the second photodetector, each frame comprising a plurality of pixels, each pixel of the plurality of pixels having a pixel grid location (PGL) and a pixel intensity value (PIV);

calculating an average pixel intensity value (av-PIV1) for each pixel in the first sample set (S1) by summing pixel intensity values (PIV1) of pixels having the same pixel grid location (PGL1) across the series of frames of the first sample set (S1), and calculating an average pixel intensity value (av-PIV2) for each pixel in the second sample set (S2) by summing pixel intensity values (PIV2) of pixels having the same pixel grid location (PGL2) across the series of frames of the second sample set (S2);

calculating a pixel fluctuation (PF1) for each pixel in the first sample set by subtracting the pixel intensity value (PIV1) of each pixel from the average pixel intensity value (av-PIV1), and calculating a pixel fluctuation (PF2) for each pixel in the second sample set by subtracting the pixel intensity value (PIV2) of each pixel from the average pixel intensity value (av-PIV2); calculate a frame intensity (FI2) for each frame of the series of frames of the second sample set (S2) by summing the pixel fluctuations (PF2) in each frame;

calculating a frame intensity multiplied pixel intensity value (FIM-PIV1) for each pixel in the first sample set by multiplying the pixel fluctuation (PF1) for each pixel in each frame of the first sample set (S1) by the frame intensity (FI2) of each corresponding frame of the second sample set (S2);

calculating a sample set frame average (FA1) by summing the frame intensity multiplied pixel intensity value (FIM-PIV1) of each frame of the series of frames of the first sample set (S1) and dividing by the number of frames in the first sample set (S1); and, calculating a modified pixel intensity value (m-PIV1) for each pixel from all inputted frames from the first photodetector by subtracting the sample set frame average (FA1) from pixel value intensity (PIV1) of pixels in all inputted frames to form a improved image.

In another preferred embodiment, there is provided a method of use of the camera system, comprising the following processor implemented steps not necessarily in sequential order:

providing to the first fluctuation identifier a first series of frames (FS1) from the first photodetector, and providing to the second fluctuation identifier a second series of frames (FS2) from the second photodetector, wherein the first photodetector is frame synchronized with the second photodetector, each frame comprising a plurality of pixels, each pixel of the plurality of pixels having a pixel grid location (PGL) and a pixel intensity value (PIV);

calculating an average pixel intensity value (av-PIV1) for each pixel in the first series of frames (FS1) by summing pixel intensity values (PIV1) of pixels having the same pixel grid location (PGL1) across the series of frames of the first series of frames (FS1), and calculating an average pixel intensity value (av-PIV2) for each pixel in the second series of frames (FS2) by summing pixel intensity values (PIV2) of pixels having the same pixel grid location (PGL2) across the series of frames of the second series of frames (FS2);

calculating a pixel fluctuation (PF1) for each pixel in the first series of frames (FS1) by subtracting the pixel intensity value (PIV1) of each pixel from the average pixel intensity value (av-PIV1), and calculating a pixel fluctuation (PF2) for each pixel in the second series of frames (FS2) by subtracting the pixel intensity value (PIV2) of each pixel from the average pixel intensity value (av-PIV2);

calculate a pixel fluctuation product (FP) by multiplying the pixel fluctuation (PF1) for each pixel in each frame of the first series of frames (FS1) by the pixel fluctuation (PF2) for each corresponding pixel in each frame of the second series of frames (FS2); and, calculate a combined pixel average (CPA) by summing the pixel fluctuation product (FP) of each frame of a series of frames and dividing by the number of frames in the series of frames (FS1 or FS2) and using the combined pixel average to form a improved image.

In another preferred embodiment, there is provided a method of use of the camera system, comprising the following processor implemented steps not necessarily in sequential order: providing a set of a series of frames of a given region of interest from the two detectors;

determining the value of each pixel within each frame to form a pixel value array for each frame for each detector; summing over all the frames for each pixel and dividing by the number of frames to calculate the average intensity for each pixel;

subtracting the average intensity from each frame to calculate the fluctuation from average for each frame, producing intensity fluctuations per pixel per frame;

for detector 2, for a given region of interest, summing over all the intensity fluctuations per pixel to produce a total pixel intensity fluctuation per frame;

multiplying each pixel fluctuation per frame of detector 1 by the total pixel intensity fluctuation per frame of detector 2, producing a pixel fluctuation intensity product;

summing over this pixel fluctuation intensity product and dividing by the number of frames summed over to provide an array of modified pixel values forming an improved image.

In another preferred embodiment, there is provided a method of use of the camera system of claim 1 comprising the following processor implemented steps not necessarily in sequential order: providing a set of a series of frames of a given region of interest from the two detectors; determining the value of each pixel within each frame to form a pixel value array for each frame for each detector; summing over all the frames for each pixel and dividing by the number of frames to calculate the average intensity for each pixel;

subtracting the average intensity from each frame to calculate the fluctuation from average for each frame, producing intensity fluctuations per pixel per frame;

multiplying each pixel fluctuation per frame of detector 1 by the corresponding pixel fluctuation per frame of detector 2 producing a pixel fluctuation intensity product;

summing over this pixel fluctuation intensity product and dividing by the number of frames summed over to provide an array of modified pixel values forming an improved image.

In another preferred embodiment, there is provided a method wherein the camera system is located on a satellite, airplane, helicopter, drone or other aerial vehicle.

In another preferred embodiment, there is provided a method wherein the thermal light photons inputted into the camera system were influenced by the effects of turbulence or adverse weather effects.

In another preferred embodiment, there is provided a method, wherein the modified pixel intensity value (m-PIV1) for each pixel from all inputted frames from the first photodetector is limited to pixels from a region of interest.

BRIEF DESCRIPTION OF THE DRAWINGS

FIG. 2 is a resolution comparison for different imaging technologies of three 12.41 μm wide slits imaged by a 10 mm diameter source: FIG. 2(a) shows an unresolved first-order classical image, where the gray shading marks the location of the slits; FIG. 2(b) shows unresolved images from the speckle-to-speckle autocorrelation. The blue triangles are the result of $\langle n_1(\rho_1) n_1(\rho_1) \rangle$; the black dots indicate $\langle \Delta n_1(\rho_1) \Delta n_1 \rho_1 \rangle$; FIG. 2(c) shows a completely resolved image observed according to the present invention from $\langle \Delta n_1 \Delta n_{2\pm} \rangle$; FIG. 2(d) shows $\langle \Delta n_1 \Delta n_2 \rangle$ as function of the position of $D_2$ vs. position of scanning detector $D_1$ where the color scale is linear from 0 to 1 and represents normalized $\langle \Delta n_1 \Delta n_{2\pm} \rangle$; the data which produced (c) were taken at the positions indicated by the blue and teal lines; blue is for $\Delta n_{2+}$ and teal is for $\Delta n_{2-}$.

DETAILED DESCRIPTION OF THE INVENTION

Figure 1:
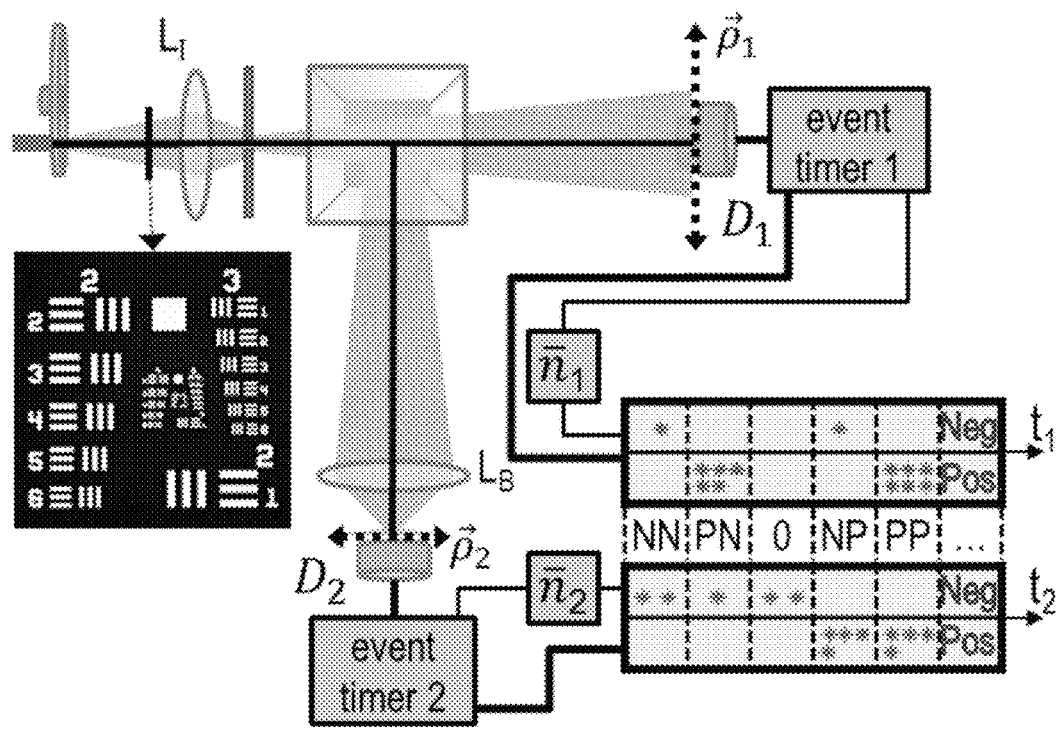
FIG. 1 is a schematic drawing of the experimental setup for studying intensity-fluctuation and second-order spatial correlation and anti-correlation by scanning point-like photodetector DA transversely.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following terms, as used herein, have the following meanings:

A "beam splitter" refers to any device that functions to split a beam of incident light into two or more subcomponent beams or photonic signals. It is contemplated as within the scope of the invention that a beam splitter may be a photodetector or CCD device that receives incident photons and splits an output signal according to an pixel mapping scheme, such that, for example, a beam is split according to an even pixel and odd pixel scheme applied to the photodetector or CCD device.

The term "thermal light photons" refers to any turbulent photon source, such as the Sun, a lamp, a thermal light source, and an LED emitting the appropriate wavelengths. The term "reflected radiation photons" refers to photons that are not directly incident on the photodetector from the photon source, but rather are emitted from a primary photon source and are then reflected and indirectly incident on the photodetector. As used herein, the physics applies to incoherent electromagnetic radiation sources, but narrow band, coherent sources, such as a laser, are inoperative.

A "photodetector" as used herein refers to a semiconductor image-sensor device such as a pixel array or film that uses a photoelectric mechanism to detect photons that cause electrons within the semiconductor to transition from the valence band to the conduction band, or more simply a device that captures light and converts it to electrical signals. Examples within the scope of the present invention include a short-wave infrared photodetector (SWIR), a medium-wave infrared photodetector (MWIR), a long-wave infrared photodetector (LWIR), a visible wavelength photodetector (VIS), and a ultraviolet wavelength photodetector (UV). Non-limiting examples within the scope of the invention of the short-wave infrared photodetector include a detector consisting of an InGaAs (Indium Gallium Arsinide) detector, a quantum dot film detector, a HgCdTe (Mercury Cadmium Telluride) detector, a Strained Layer Superlattice (SLS) detector, a PbSe (Lead Selenium) detector, and devices having a combination thereof. Non-limiting examples within the scope of the invention of the medium-wave infrared photodetector include a detector consisting of an nBn (N-type Barrier N-type) detector, an InSb (Indium Tin) detector, a quantum dot film detector, a HgCdTe (Mercury Cadmium Telluride) detector, a Strained Layer Superlattice (SLS) detector, a PbSe (Lead Selenium) detector, and devices having a combination thereof. Non-limiting examples within the scope of the invention of the long-wave infrared photodetector include a HgCdTe (Mercury Cadmium Telluride) detector, a Strained Layer Superlattice (SLS) detector, and devices having a combination thereof. Non-limiting examples within the scope of the invention of the visible-wavelength photodetector include a CMOS (Complementary Metal Oxide Semiconductor) silicon detector, a quantum dot film detector, and devices having a combination thereof. Non-limiting examples within the scope of the invention of the ultraviolet-wavelength photodetector include a quantum dot film detector.

The term "charge-coupled device" (CCD) as used herein is a device for the movement of electrical charge, usually from within the device to an area where the charge can be manipulated, for example conversion into a digital value. This is achieved by "shifting" the signals between stages within the device one at a time. CCDs move charge between capacitive bins in the device, with the shift allowing for the transfer of charge between bins.

The term "read out integrated circuit" (ROIC) refers to a multiplexer circuit that is required for use with an IR sensor due to the exotic materials required in the IR sensor/photodetector. These IR sensor materials, HgCdTe, INSb, InGaAs, VOx, etc., must be paired with silicon CMOS to provide the connection to the measurement circuitry.

The term "Field Programmable Gate Array" (FPGA) refers to an integrated circuit that is custom configured using hardware description language. FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory.

The term "Application Specific Integrated Circuit" (ASIC) refers to an integrated circuit that is pre-configured in its logic architecture to perform a specific function, and is not reconfigurable.

The term "Digital Signal Processing" and/or "Digital Signal Processor" (DSP) refers to software programming instructions executed on a specialized microprocessor that is optimized for performing software programming instructions used to execute digital signal processing algorithms. Non-limiting examples of the functions of such algorithms include converting analog to digital, performing required mathematical processes, and detecting and correcting digital electronic transmissions. Specific DSP tools include MATLAB® and SIMULINK® for providing algorithms, applications and scopes for designing, simulating and analyzing signal processing for the invention, including designing and implementing any embedded code, software defined logic architectures, FIR, IIR, multirate, multistage and adaptive filters, streaming signals from variables, data files, and network devices. Software, like MATLAB® etc., is contemplated for use as either or both a DSP software hardware-substitute of FPGAs and/or ASICs, adjuncts for FPGAs and ASICs, and/or control software for FPGAs and ASICs.

FPGAs, ASICs, and DSPs are all contemplated as within the scope of the invention for calibrating the non-uniform output of IR sensor arrays to provide corrected data to the imaging module.

"Image sensor" means: a camera, charge coupled device (CCD), video device, spatial sensor, or range sensor. The image sensor may comprise a device having a shutter controlled aperture that, when opened, admits light enabling an object to be focused, usually by means of a lens, onto a surface, thereby producing a photographic image OR a device in which the picture is formed before it is changed into electric impulses.

"Pixel" refers to a single scalar element (PICTure ELement) of a multicomponent digital image representation. A pixel is the smallest point unit of a digitally sampled image, and pixels are arranged in regular and irregular grids.

A "coincidence circuit" is an electronic device with one output and two (or more) inputs. The output is activated only when signals are received within a time window accepted as at the same time and in parallel at both inputs. Coincidence circuits are widely used in particle physics experiments and in other areas of science and technology.

"Photon Noise" (aka Shot noise) is a type of electronic noise which originates from the discrete nature of electric charge. The term also applies to photon counting in optical devices, where photon noise is associated with the particle nature of light.

"Ghost imaging" is a technique that produces an image of an object by combining information from two light detectors: a conventional, multi-pixel detector that does not view the object, and a single pixel (bucket) detector that does view the object.

"Type-one ghost imaging" is ghost imaging in which the imaging resolution is determined by the angular diameter, AO, of the thermal source, and not by the diameters of the two imaging lenses.

"Object" means: an area, a scene, an object or objects, a landscape, overhead view of land or an object or objects, or a combination thereof.

"Frame" means: a picture, an image or one of the successive pictures on a strip of film or video. Synchronized frames can include sequential and non-sequential frames. However, frames from two different photodetectors will to be synchronized in order for the protocol to function.

"Process" means an algorithm, software, subroutine, computer program, or methodology.

"Algorithm" means: sequence of steps using computer software, process, software, subroutine, computer program, or methodology.

"PNFC protocol" means the novel photon number fluctuation correlation measurement protocol as fully disclosed herein.

"PNFC Circuit" (PNFC) means a coincidence circuit employing the PNFC protocol.

"Processor" or "image processor" as used in the following claims includes a computer, multiprocessor, CPU, minicomputer, microprocessor or any machine similar to a computer or processor which is capable of processing algorithms.

"Operations" as used in the following claims includes steps, a series of operations, actions, processes, subprocesses, acts, functions, and/or subroutines.

"Array" refers to a systematic arrangement of data in rows and columns. An example of an array is a matrix which is a rectangular array of numbers, symbols, or expressions. Non-limiting examples of IR pixel arrays include pixel matrices having rows and columns ranging from 256 pixels to 2048 pixels. Specific non-limiting examples have rows and columns having 4096 pixels, 2560 pixels, 2048 pixels, 1280 pixels, 1024 pixels, 960 pixels, 640 pixels, 512 pixels, 480 pixels, 320 pixels, 256 pixels, and combinations thereof. Each array row and column may have the same number of pixels or may be different.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As provided herein, a solution to surpass the Rayleigh resolution limit is to measure the higher-order correlation of light rather than the intensity.

Using a setup described herein, the imaging resolution can be improved significantly, at least better than $\sqrt{}$ by using a higher-order coherence the forming mechanism. And, in contrast to other sub-Rayleigh resolution schemes, the present invention works with thermal light.

Referring now to FIG. 1, a camera set-up is shown schematically. Like a classical camera, it has an imaging lens of limited aperture, $L_I$. The object, which is exterior to the camera, is imaged on the image plane(s) and observed by the photodetector(s); however, this camera has two optical arms behind its imaging lens $L_I$. A 532 nm pseudothermal light source illuminates the object. The scattered light from the object falls on a scanning single-mode 0.005 mm diameter fiber tip that is interfaced with a photon counting detector $D_1$. The scanning fiber tip ($D_1$) acts as a photodetector array and is placed on the image plane of arm-one. On the image plane of arm-two is a specially designed photodetector, also called a "bucket detector." The bucket detector consists of a collection lens $L_B$ and a multimode 0.105 mm diameter fiber tip that is interfaced with another photon counting detector $D_2$. The fiber tip ($D_2$) is placed on the focal plane of the collection lens $L_B$ at a transverse position that is outside the zero-order Fourier transform zone. This modified bucket detector integrates only the higher-order spatial frequencies of the image. The correlation by joint photodetection of $D_1$ and $D_2$ f the higher spatial frequency photon-number fluctuations from arm-two and the photon-number fluctuations from arm-one provides greater phase delays among the "two-photon" optical paths between $D_1$ and $D_2$ necessary for second-order destructive interference, and consequently improves the imaging resolution.

The photon-number fluctuation at each scanning position of the photon counting detector $D_1$, $\Delta n_1(\rho_1, t_j)$, and the photon-number fluctuation of the bucket detector, $D_2$, $\Delta n_2(\rho_2, t_j)$, are measured by a Fluctuation Circuit (FC) around time $t_j$ of the jth coincidence time window. The photon-number fluctuation correlation, $\langle \Delta n_1 \Delta n_2 \rangle$, is calculated as a function of $\rho_1$. An image of the object is observable from $\langle \Delta n_1 \Delta n_2 \rangle$, even when the first-order classical image of the object, which is the direct output of $\langle n_1(\rho_1) \rangle$, and the autocorrelations $\langle n_1(\rho_1) n_1(\rho_1) \rangle$ and $\langle \Delta n_1(\rho_1) \Delta n_1(\rho_1) \rangle$, are completely blurred due to the use of a relatively small imaging lens.

In one non-limiting example according to the present invention, the Fluctuation Circuit is a Positive-Negative Fluctuation Circuit (PNFC). In another non-limiting example according to the present invention, the Fluctuation Circuit is a Variable or Gradient Fluctuation Circuit (VFC) capable of processing signal magnitude.

Referring now to FIG. 2, typical experimental results are presented in FIG. 2. In this measurement, the object to be imaged was the 5-3 element of a 1951 USAF Resolution Test Target. FIG. 2(a) shows a completely unresolved first-order classical image of the three slits in $\langle n_1(\rho_1) \rangle$ that was directly measured by the scanning detector D1. For reference the gray shading indicates the location of the slits. FIG. 2(b) shows two results: the black dots plot the autocorrelations $\langle n1(\vec{p}1) n1(\vec{p}1) \rangle$, which was calculated at each scanning point, while the blue triangles show $\langle \Delta n1(\vec{p}1) \Delta n1(\vec{p}1) \rangle$ at each point. This fluctuation autocorrelation was calculated from the photon-number counting of D1. The measurements in FIG. 2(b) have a al. [2]. The resolution of the autocorrelation in the image plane is approximately $\delta x/\sqrt{2} = 0.17$ mm which, as seen in 2(b), is still not enough to resolve the three slits which have a slit-to-slit separation of about 0.13 mm. However, by taking advantage of the second-order coherence of $\langle \Delta n1 \Delta n2 \rangle$, the three slits of the 5-3 element of the gauge were clearly separated in FIG. 2(c).

FIG. 2(c) is the combination of two experiments where the bucket fiber tip D2 was positioned at x2+≈0.22 and x2−≈−0.24 relative to the central maximum. These are indicated in FIG. 2(d) by the blue and teal lines, respectively. Ideally the measurement would be made using a CCD with the central pixels blocked in order to integrate over all of the bucket detector's focal plane, excluding the center; to demonstrate this two points on opposite sides of the central maximum were chosen and the combined fluctuation correlation calculated from ⟨Δn1 Δn2±⟩ where Δn2±=n2−+n2+− n2 and n2 is the average photon number of n2−+n2+.

It is worth mentioning that (1) the quality of the observed image is very sensitive to the angular alignment between the imaging lens, LI, and the Fourier transform lens, LB. Slight misalignment may cause distortion of the image as shown on the left side of the image; (2) compared to first-order classical imaging, in order to achieve the same level of statistics the reported imaging mechanism needs a longer exposure time. One way to accomplish this is to place a photodetector in the focal plane of the Fourier transform lens, instead of only two point-like photodetectors, but turn off or block the central pixels corresponding to the zero-order Fourier transform pattern. This would allow D2 to collect more higher spatial frequency light.

As seen in FIG. 2, all three peaks are certainly well-resolved, demonstrating a resolution improvement greater than 1.83. A limit on the resolution improvement other than that due to the angular size of the source has not yet been observed; the "camera" setup was able to resolve all visible slits of the resolution gauge, from elements 5-1 to 5-4.

angular size of the source has not yet been observed; the "camera" setup was able to resolve all visible slits of the resolution gauge, from elements 5-1 to 54.

In the following, we give a simplified analysis of the experimental observation. First we examine the photon-number fluctuation correlation in the object plane ⟨ΔnoΔno'⟩, then propagate it to the image plane. If ⟨ΔnoΔno'⟩ is still able to resolve the aperture function, then the convolution between the image, its Fourier transform, and ⟨ΔnoΔno'⟩ is still able to produce a resolvable image.

We describe the thermal source as a large number of independent and randomly radiating point sub-sources evenly distributed on a disk normal to the object plane. In a natural thermal source, such as the sun, each sub-source corresponds to an atomic transition. In our pseudo-thermal source, millions of tiny scattering diffusers on the rotating ground glass play the role of sub-sources. The diffusers scatter the laser beam to all possible directions denoted by k, during which the scattered fields also acquire random phases. L$\alpha$m(k)⟩ describes the state of a subfield scattered by the mth diffuser with a vector k. We assume that the pseudo-thermal field is monochromatic and concentrate on its transverse spatial behavior.

We can then write a thermal or pseudo-thermal field in the coherent state representation:

FORMULA 2

$$|\Psi\rangle = \prod_m |\{\alpha_m\}\rangle = \prod_{m,k} |\alpha_m(k)\rangle,$$

where m labels the mth subfield that is created or scattered from the mth sub-source and k is a wavevector. $|\alpha_m(k)\rangle$ is an eigenstate of the annihilation operator with an eigenvalue $\alpha_m(k)$, $$\hat{a}_m(k)|\alpha_m(k)\rangle = \alpha_m(k)|\alpha_m(k)\rangle.$$  FORMULA 3

Thus we have $$\hat{a}_m(k)|\Psi\rangle = \alpha_m(k)|\Psi\rangle.$$  FORMULA 4

The field operator at detector Dj, j =1,2, can be written in the following form in terms of the sub-sources:

FORMULA 5

$$\hat{E}^{(+)}(\vec{\rho}_j, t_j) = \int dk \sum_m \hat{a}_m(k) g_m(k; \vec{\rho}_j, t_j)$$

where gm(k; $\vec{\rho}_j$, t$_j$) is the Green's function that propagates the mth subfield from the mth sub-source to the jth position.

Next, we apply the Glauber-Scully theory to calculate the photon-number fluctuation correlation from the second-order coherence function $G^{(2)}(\vec{\rho}_j, t_j; \vec{\rho}_k, t_k)$:

FORMULA 6

$$G^{(2)}(\vec{\rho}_j, t_j; \vec{\rho}_k, t_k) = \langle\langle \Psi | E^{(-)}(\vec{\rho}_j, t_j) E^{(-)}(\vec{\rho}_k, t_k)$$
$$E^{(+)}(\vec{\rho}_k, t_k) E^{(+)}(\vec{\rho}_j, t_j) | \Psi \rangle\rangle_{Es}$$
$$= \sum_m \psi_m^*(\vec{\rho}_j, t_j) \psi_m(\vec{\rho}_j, t_j)$$
$$\sum_n \psi_n^*(\vec{\rho}_k, t_k) \psi_n(\vec{\rho}_k, t_k) +$$
$$\sum_{m \neq n} \psi_m^*(\vec{\rho}_j, t_j) \psi_n(\vec{\rho}_j, t_j) \psi_n^*(\vec{\rho}_k, t_k) \psi_m(\vec{\rho}_k, t_k)$$
$$= \langle n_j \rangle \langle n_k \rangle + \langle \Delta n_j \Delta n_k \rangle.$$

Here $\psi_m(\vec{\rho}_j, t_j)$ is the effective wavefunction of the mth subfield at ($\vec{\rho}_j$, t$_j$), which has the following form, assuming a single longitudinal mode:

$$\psi_m(\vec{\rho}_j, t_j) = \int d\vec{\kappa}\, \alpha_m(\vec{\kappa}) g_m(\vec{\kappa}; \vec{\rho}_j, t_j)$$  FORMULA 7

In the above calculation, we completed the quantum average by considering the commutation rule of the creation and annihilation operators, and the ensemble average by taking into account all possible random relative phases between a large number of incoherent subfields.

The photon-number fluctuation correlation in the object plane is thus:

FORMULA 8

$$\langle \Delta n_o \Delta n_{o'} \rangle = \sum_{m \neq n} \psi_m^*(\vec{\rho}_o, t_o) \psi_n(\vec{\rho}_o, t_{o'}) \psi_n^*(\vec{\rho}_o, t_o) \psi_m(\vec{\rho}_{o'}, t_{o'})$$
$$= \sum_{m \neq n} \int d\vec{\kappa} \int d\vec{\kappa}' |\alpha_m|^2 |\alpha_n|^2 [g_m^*(\vec{\kappa}; \vec{\rho}_o, t_o)$$
$$g_n(\vec{\kappa}'; \vec{\rho}_{o'}, t_{o'})] \times [g_n^*(\vec{\kappa}'; \vec{\rho}_o, t_o) g_m(\vec{\kappa}; \vec{\rho}_{o'}, t_{o'})]$$
$$\propto \text{somb}^2\left(\frac{\pi \Delta \theta_s}{\lambda} |\vec{\rho}_o - \vec{\rho}_{o'}|\right),$$

where we have assumed constant α of the subfields. Next we propagate the fields from the object plane to the image plane on each side of the beam splitter, and then from the image plane to the modified bucket fiber tip. This results in:

FORMULA 9

$$R_c(\vec{\rho}_1, \vec{\rho}_2) = \left| \int\int\int d\vec{\rho}_{2L} d\vec{\rho}_o d\vec{\rho}_{o'} \, \text{somb}\left[\frac{\pi}{\lambda}\frac{D}{s_o}(|\vec{\rho}_o - \vec{\rho}_1/\mu|)\right] \times \right.$$
$$\text{somb}\left[\frac{\pi}{\lambda}\frac{D}{s_o}(|\vec{\rho}_{o'} - \vec{\rho}_{2L}/\mu|)\right] \text{somb}\left(\frac{\pi\Delta\theta_s}{\lambda}|\vec{\rho}_o - \vec{\rho}_{o'}|\right) \times$$
$$e^{-ik\vec{\rho}_2 \cdot \vec{\rho}_{2L}/f_2} e^{-ik(\vec{\rho}_{o'}^2 + \vec{\rho}_{2L}^2/\mu)/(2s_o) - ik\vec{\rho}_{o'}^2/(2z_o)} \times$$
$$\left. e^{ik(\vec{\rho}_o^2 + \vec{\rho}_1^2/\mu)/(2s_o) + ik\vec{\rho}_o^2/(2z_o)} A(\vec{\rho}_o) A(\vec{\rho}_{o'}) \right|^2 = \left| \int\int d\vec{\rho}_o d\vec{\rho}_{o'} \right.$$
$$\left. T(\vec{\rho}_o, \vec{\rho}_1) \mathcal{F}_{k\vec{\rho}_2/f_2}\{T(\vec{\rho}_{o'}, \vec{\rho}_{2L})\} \text{somb}\left(\frac{\pi\Delta\theta_s}{\lambda}|\vec{\rho}_o - \vec{\rho}_{o'}|\right) \right|^2$$

where $\vec{\rho}_1$ is the transverse coordinate of the scanning detector D1, or the photodetector element, $\vec{\rho}_{2L}$ is the bucket lens coordinate, and $\vec{922}$ is the transverse coordinate of the bucket fiber tip D2; the first-order imaging equation

FORMULA 10

$$T(\vec{\rho}_o, \vec{\rho}_1) \equiv$$
$$A(\vec{\rho}_o) \text{somb}\left[\frac{\pi D}{\lambda s_o}(|\vec{\rho}_o - \vec{\rho}_1/\mu|)\right] \times e^{ik(\rho_o^2 + \rho_1^2/\mu)/(2s_o) + ik\rho_o^2/(2z_o)}$$

with $\Delta\theta_s$ the angular diameter of the thermal light source.

We define a second-order imaging function $F(\vec{\rho}_o; \vec{\rho}_2)$ with a resolution determined by the angular size $\Delta\theta$ of the thermal light source as:

FORMULA 11 and FORMULA 12

$$F(\vec{\rho}_o, \vec{\rho}_2) \equiv \int d\vec{\rho}_{o'} \cdot \mathcal{F}_{k\vec{\rho}_2/f_2}\{T(\vec{\rho}_{o'}, \vec{\rho}_{2L})\} \text{somb}\left(\frac{\pi\Delta\theta_s}{\lambda}|\vec{\rho}_o - \vec{\rho}_{o'}|\right). \quad (11)$$

Then Eq. 9 can be written as:

$$R_c(\vec{\rho}_1, \vec{\rho}_2) \propto \quad (12)$$
$$\left| \int d\vec{\rho}_o A(\vec{\rho}_o) e^{ik\frac{\rho_o^2}{2}(1/s_o + 1/z_o)} \text{somb}\left[\frac{\pi}{\lambda}\frac{D}{s_o}|\vec{\rho}_o - \vec{\rho}_1/\mu|\right] F(\vec{\rho}_o, \vec{\rho}_2) \right|^2 =$$
$$|T(\vec{\rho}_o, \vec{\rho}_1) \otimes F(\vec{\rho}_o, \vec{\rho}_2)|^2.$$

Comparing Eqs. 11 and 12 with the classical imaging resolution in Eq. 1, we find that if $k|\vec{\rho}_2|/f_2 > 0$ Eq. 12 results in a second-order resolution limited in theory by the angular diameter of the thermal light source. It is important that $\vec{\rho}_2$ is located outside of the central maximum of the Fourier transform (zero-order); without meeting this condition the joint measurement of D1 and D2 may not introduce large enough phase delays among the two-photon effective wave $\rho_o/=\rho_o'$ and consequently improve the imaging resolution. In-stead, the second-order image will be at best the same as the first-order image squared. This off-center condition can be easily met by using a photodetector and blocking the central maximum; as long as the angular size of the light source is large enough, a well-resolved image is observable in the photon-number fluctuation correlation even if the classical image as well as its higher-order products are completely blurred due to the smaller lens; the experiment reported in this Letter confirms Eq. 12.

Examining Eq. 12, if $\Delta\theta_s$ is large, the relative phases for different m-n pairs may take all possible values from 0 to $2\pi$, resulting in complete destructive addition for all m-n pairs when $\rho_o/=\rho_o'$. In this case, the cross interference terms can be treated as a $\delta$-function of $|\vec{\rho}_o - \vec{\rho}_o'|$. Then the maximum photon-number fluctuation correlation occurs only when the light travels equal paths from the source plane to the same object point and then through the lens(es) to the detectors, resulting in a perfect image reproduced in the photon-number fluctuation coincidences.

For a smaller angular source, when $\rho_o$ is slightly different from $\rho_o'$, the maximum phase differences may not be able to reach $2\pi$, resulting in an incomplete destructive addition of the superposition terms. In this case, the cross interference term $\text{somb}^2[(\pi\Delta\theta/\lambda)|\vec{\rho}_o - \rho_o''|]$ cannot be treated as a $\delta$-function.

The photon-number fluctuation correlation function then has an increased width dependent on the angular size of the source $\Delta\theta_s$, resulting in limited imaging resolution. This second-order constructive-destructive interference determines its imaging resolution. Similar to first-order imaging, the image observed in the photon-number fluctuation correlation is produced by constructive second-order interference, while its resolution is limited by destructive second-order interference.

Accordingly provided herein is an imaging mechanism with nonclassical imaging resolution. The results show that even when the first-order classical images are blurred due to the limited size of the imaging lens, this imaging mechanism invention can still completely resolve the object. In addition to its nonclassical imaging resolution, the photon-number fluctuation correlation $\langle \Delta n_o \Delta n_o' \rangle = \text{somb}^2[(\pi\Delta\theta/\lambda)\rho_o - \rho_o']$ is also "turbulence-free". These aspects, and the ability to use naturally occurring thermal light, are particularly attractive for sunlight long-distance imaging: the angular diameter of the sun is ~0.53○, providing in principle a turbulence-free resolution of 200 μm for any object on earth at any distance without the need of huge lenses.

Figure 3:
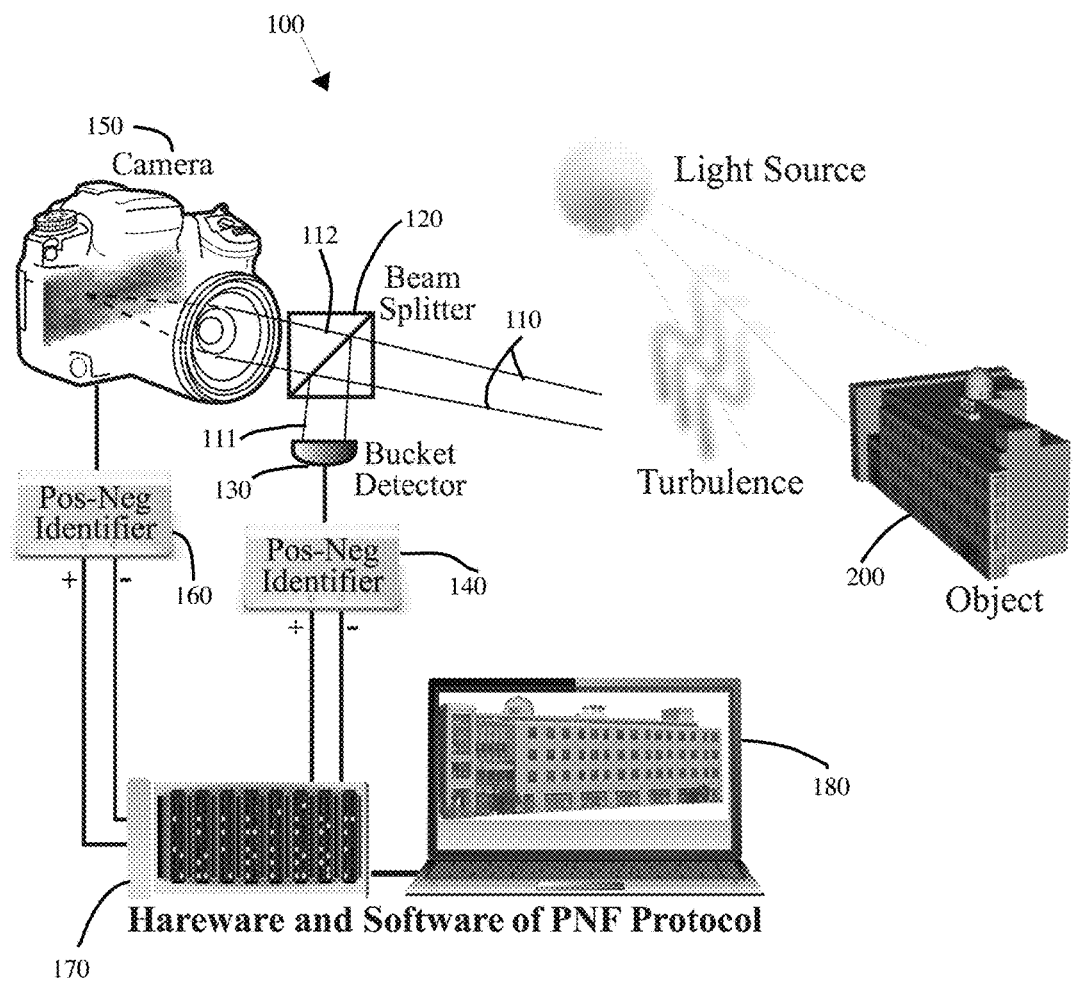
FIG. 3 is a schematic drawing evidencing one embodiment of the disclosed non-classical camera.

Referring now to FIG. 3, a schematic drawing is shown evidencing one embodiment of the disclosed turbulence-free camera system 100 that uses natural sunlight for turbulence-free distant imaging applications with enhanced spatial resolution and full color reproduction. In FIG. 3, correlated photons 110 pass through beam splitter 120 and are split, with split photons 111 passing to bucket photodetector 130 and thereby to Pos-Neg Identifier 140 and thereby to a PNF circuit (PNFC) 170, while split photons 112 pass to Photodetector Camera 150 (SWIR, MWIR, LWIR VIS, UV) and thereby to Pos-Neg Identifier 160 and thereby to a PNFC 170, with PNFC 170 finally passing reconstituted imaging information to final image viewing device 180.

FIG. 3 shows the operations employed by camera system 100, are as follows. Photodetector camera 150 takes a picture through atmospheric turbulence. The image of the target on the photodetector array will be "blurred" due to the turbulence or due to the poor spatial resolution of the camera, if its imaging lens is not large enough for the distance to the imaged object 200. However, with the help of the bucket photodetector 130 and a novel coincidence detection protocol, namely the "PNF" protocol, a turbulence-free image of the target of 200 micrometer imaging resolution can be observed from the intensity fluctuation correlation measurement. A positive-negative fluctuation protocol distinguishes the positive and negative intensity fluctuations, or photon number fluctuation, of each pixel element and bucket photodetector 130 within a small time window. As stated, the invention works with photons having a range of electromagnetic bandwidths, including without limitation, SWIR, MWIR, LWIR VIS, and UV. With the novel protocol, we are able to measure and calculate the correlations between the positive-positive, negative-negative, and negative-positive intensity fluctuations, or photon number fluctuations between the photodetector camera 150 and the bucket photodetector 130. This "second order" correlation produces an image based on the coincidences.

Figure 4:
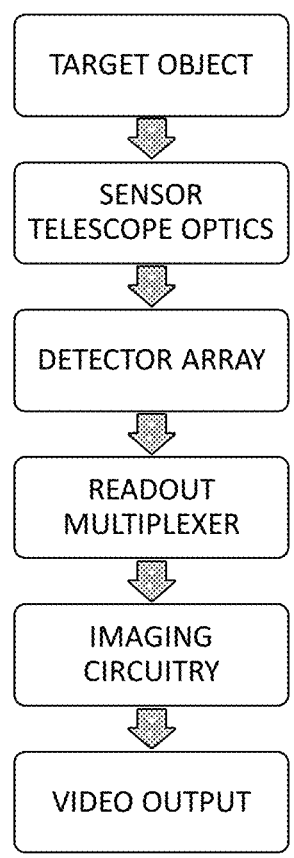
FIG. 4 is a diagram illustrating photon path from target to video output.

Referring now to FIG. 4, FIG. 4 illustrates how photons from a target object reach sensor optic of the camera. For infrared spectrum photons, photons incident on the detector array send a signal to an ROIC or readout multiplexer. The ROIC, a silicon based CMOS component send digital signals to the imaging circuitry, which is forwarded to an output, here shown in one non-limiting example as a video output.

ROIC (readout integrated circuits) may be obtained from commercially available sources, such as the Hawaii-4RG 10 um ROIC from Teledyne Technologies of Thousand Oaks Calif., Indigo Systems Corp, of Santa Barbara, Calif.

ASIC and imaging packages may be obtained from commercially available sources, such as the SIDECAR image digitization, enhancement, control and retrieval system from Teledyne Technologies of Thousand Oaks Calif.

EXAMPLE 1

Construction of Turbulence-free Non-Classical SWIR Camera

In this example a turbulence-free Non-Classical SWIR Camera is developed that is able to take second-order turbulence-free images.

Materials

The prototype unit consists of a commercial research grade SWIR camera, and hardware and software to interface with the PNFC system. Intensity fluctuation-fluctuation correlation calculations, involving large-dimensional matrix algebra, are conducted using commercial PCs and multi-crosstalk graphic cards.

SWIR Camera

Based on the optical and electronic parameters of the SWIR camera, the hardware parts are designed for a ghost imaging system including the PNFC system and the hardware-interface between the SWIR camera and the PNFC protocol as well as coincidence-measurement circuits. The wavelength of this SWIR photodetector ranges from 700 nm-3000 nm. This results in a working PNFC system and hardware interface between the SWIR camera and the PNFC. The photodetector types in the camera are selected from an InGaAs (Indium Gallium Arsinide) detector, a quantum dot film detector, a HgCdTe (Mercury Cadmium Telluride) detector, a Strained Layer Superlattice (SLS) detector, and a PbSe (Lead Selenium) detector. A ROIC is connected to the SWIR detector for communicating with the imaging circuitry. A secondary correction circuit is also included to correct non-uniformities in the pixel feed from the SWIR array. This correction circuit is selected from an FPGA, an ASIC, or DSP performed in software.

SWIR cameras may be obtained from commercially available sources, such as those from Teledyne Technologies of Thousand Oaks Calif., UTC Aerospace Systems, Princeton N.J., Xenics in Leuven BE, Pembroke Instruments, San Francisco, Calif., or FLIR Systems of Wilsonville, Oreg.

Multi-Crosstalk Graphic Cards

The software is developed for multi-crosstalk graphic cards for the system for the coincidence-measurement circuit and positive-negative fluctuation analysis. The production of this software results in working software for taking data from the SWIR camera and the bucket detector, analyzing and identifying the positive-negative fluctuations, calculating the correlations between the positive-negative fluctuations, producing the ghost image from the fluctuation-fluctuation correlation.

Interface Software and Hardware

The above individual working software is then interfaced with the individual working hardware systems to produce a working ghost imaging system with the PNFC.

EXAMPLE 2

Construction of Turbulence-free Non-Classical MWIR Camera

In this example a turbulence-free Non-Classical MWIR Camera is developed that is able to take second-order turbulence-free images.

Materials

The prototype unit consists of a commercial research grade MWIR camera, and hardware and software to interface with the PNFC system. Intensity fluctuation-fluctuation correlation calculations, involving large-dimensional matrix algebra, are conducted using commercial PCs and multi-crosstalk graphic cards.

MWIR Camera

Based on the optical and electronic parameters of the MWIR camera, the hardware parts are designed for a ghost imaging system including the PNFC system and the hardware-interface between the MWIR camera and the PNFC protocol as well as coincidence-measurement circuits. The wavelength of this MWIR photodetector ranges from 3000 nm-8000 nm. This results in a working PNFC system and hardware interface between the MWIR camera and the PNFC. The photodetector types in the camera are selected from an nBn (N-type Barrier N-type) detector, an InSb (Indium Tin) detector, a quantum dot film detector, a HgCdTe (Mercury Cadmium Telluride) detector, a Strained Layer Superlattice (SLS) detector, and a PbSe (Lead Selenium) detector. A ROIC is connected to the MWIR detector for communicating with the imaging circuitry. A secondary correction circuit is also included to correct non-uniformities in the pixel feed from the MWIR array. This correction circuit is selected from an FPGA, an ASIC, or DSP performed in software.

MWIR detectors and cameras may be obtained from commercially available sources, such as those from Teledyne Technologies of Thousand Oaks Calif., ThorLabs, Sterling, Va., Xenics in Leuven BE, or FLIR Systems of Wilsonville, Oreg.

Multi-Crosstalk Graphic Cards

The software is developed for multi-crosstalk graphic cards for the system for the coincidence-measurement circuit and positive-negative fluctuation analysis. The production of this software results in working software for taking data from the MWIR camera and the bucket detector, analyzing and identifying the positive-negative fluctuations, calculating the correlations between the positive-negative fluctuations, producing the ghost image from the fluctuation-fluctuation correlation.

Interface Software and Hardware

The above individual working software is then interfaced with the individual working hardware systems to produce a working ghost imaging system with the PNFC.

EXAMPLE 3

Construction of Turbulence-free Non-Classical LWIR Camera

In this example a turbulence-free Non-Classical LWIR Camera is developed that is able to take second-order turbulence-free images.

Materials

The prototype unit consists of a commercial research grade LWIR camera, and hardware and software to interface with the PNFC system. Intensity fluctuation-fluctuation correlation calculations, involving large-dimensional matrix algebra, are conducted using commercial PCs and multi-crosstalk graphic cards.

LWIR Camera

Based on the optical and electronic parameters of the LWIR camera, the hardware parts are designed for a ghost imaging system including the PNFC system and the hardware-interface between the LWIR camera and the PNFC protocol as well as coincidence-measurement circuits. The wavelength of this LWIR photodetector ranges from 8000 nm-15000 nm. This results in a working PNFC system and hardware interface between the LWIR camera and the PNFC. The photodetectors in the camera are selected from a HgCdTe (Mercury Cadmium Telluride) detector, and a Strained Layer Superlattice (SLS) detector. A ROIC is connected to the LWIR detector for communicating with the imaging circuitry. A secondary correction circuit is also included to correct non-uniformities in the pixel feed from the LWIR array. This correction circuit is selected from an FPGA, an ASIC, or DSP performed in software.

LWIR detectors and cameras may be obtained from commercially available sources, such as those from Teledyne Technologies of Thousand Oaks Calif., Xenics in Leuven, Belgium or DRS Technologies, Rome Italy.

Multi-Crosstalk Graphic Cards

The software is developed for multi-crosstalk graphic cards for the system for the coincidence-measurement circuit and positive-negative fluctuation analysis. The production of this software results in working software for taking data from the LWIR camera and the bucket detector, analyzing and identifying the positive-negative fluctuations, calculating the correlations between the positive-negative fluctuations, producing the ghost image from the fluctuation-fluctuation correlation.

Interface Software and Hardware

The above individual working software is then interfaced with the individual working hardware systems to produce a working ghost imaging system with the PNFC.

EXAMPLE 4

Construction of Turbulence-free Non-Classical VIS Camera

In this example a turbulence-free Non-Classical VIS (Visible Wavelength) Camera is developed that is able to take second-order turbulence-free images.

Materials

The prototype unit consists of a commercial research grade VIS camera, and hardware and software to interface with the PNFC system. Intensity fluctuation-fluctuation correlation calculations, involving large-dimensional matrix algebra, are conducted using commercial PCs and multi-crosstalk graphic cards.

VIS Camera

Based on the optical and electronic parameters of the VIS camera, the hardware parts are designed for a ghost imaging system including the PNFC system and the hardware-interface between the VIS camera and the PNFC protocol as well as coincidence-measurement circuits. The wavelength of this VIS photodetector ranges from 400 nm-700 nm. This results in a working PNFC system and hardware interface between the VIS camera and the PNFC. The photodetectors in the camera are selected from a silicon detector, and a quantum dot film detector. If a silicon photodetector is used, a ROIC is not necessary for the VIS detector for communicating with the imaging circuitry since a silicon CMOS photodetector can be made in the same silicon CMOS process as the circuitry. However, if a Quantum Dot Film photodetector is used, a ROIC is necessary for the VIS detector for communicating with the imaging circuitry since a Quantum Dot Film photodetectors are made from solution and not made in the same silicon CMOS process as the circuitry communicating with the imaging apparatus. A secondary correction circuit is not necessary but may be included to correct non-uniformities in the pixel feed from the VIS array. This correction circuit is selected from an FPGA, an ASIC, or DSP performed in software.

VIS or silicon photodetectors may be obtained from commercially available sources, such as Teledyne Technologies of Thousand Oaks Calif., ThorLabs of Sterling Va. or DataRay Inc. of Redding, Calif.

Multi-Crosstalk Graphic Cards

The software is developed for multi-crosstalk graphic cards for the system for the coincidence-measurement circuit and positive-negative fluctuation analysis. The production of this software results in working software for taking data from the VIS camera and the bucket detector, analyzing and identifying the positive-negative fluctuations, calculating the correlations between the positive-negative fluctuations, producing the ghost image from the fluctuation-fluctuation correlation.

Interface Software and Hardware

The above individual working software is then interfaced with the individual working hardware systems to produce a working ghost imaging system with the PNFC.

EXAMPLE 5

Construction of Turbulence-free Non-Classical UV Camera

In this example a turbulence-free Non-Classical UV Camera is developed that is able to take second-order turbulence-free images.

Materials

The prototype unit consists of a commercial research grade UV camera, and hardware and software to interface with the PNFC system. Intensity fluctuation-fluctuation correlation calculations, involving large-dimensional matrix algebra, are conducted using commercial PCs and multi-crosstalk graphic cards.

UV Camera

Based on the optical and electronic parameters of the UV camera, the hardware parts are designed for a ghost imaging system including the PNFC system and the hardware-interface between the UV camera and the PNFC protocol as well as coincidence-measurement circuits. The wavelength of this UV photodetector ranges from 10 nm-400 nm. This results in a working PNFC system and hardware interface between the UV camera and the PNFC. The photodetectors in the camera are quantum dot film detectors. Since Quantum Dot Film photodetectors are used, a ROIC is necessary for the UV detector for communicating with the imaging circuitry since Quantum Dot Film photodetectors are made from solution and not made in the same silicon CMOS process as the circuitry communicating with the imaging apparatus. A secondary correction circuit is not necessary but may be included to correct non-uniformities in the pixel feed from the UV array. This correction circuit is selected from an FPGA, an ASIC, or DSP performed in software.

UV photodetectors may be obtained from commercially available sources, such as Teledyne Technologies of Thousand Oaks Calif., and Newport Corp. from Irvine Calif.

Multi-Crosstalk Graphic Cards

The software is developed for multi-crosstalk graphic cards for the system for the coincidence-measurement circuit and positive-negative fluctuation analysis. The production of this software results in working software for taking data from the UV camera and the bucket detector, analyzing and identifying the positive-negative fluctuations, calculating the correlations between the positive-negative fluctuations, producing the ghost image from the fluctuation-fluctuation correlation.

Interface Software and Hardware

The above individual working software is then interfaced with the individual working hardware systems to produce a working ghost imaging system with the PNFC.

Figure 5:
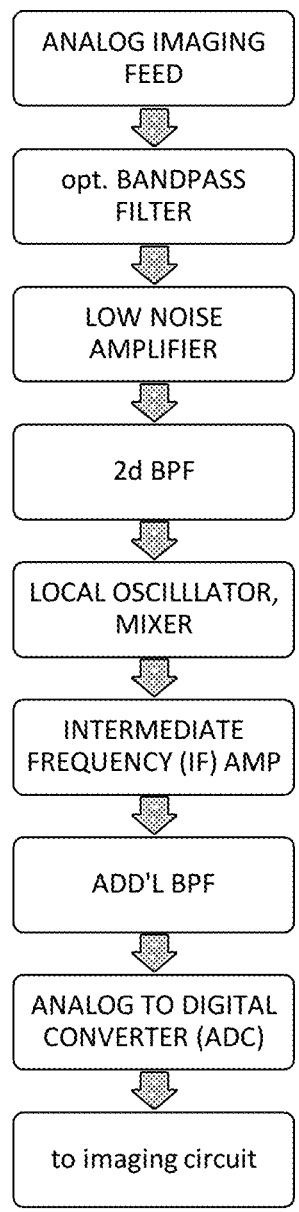
FIG. 5 is a diagram illustrating optional pre-digital signal processing of analog photon feed.

Referring now to FIG. 5, standard EM digital signal processing actions are contemplated as within the scope of the invention. However, before a photon or EM quanta is converted from analog to digital, analog signal processing may optionally be employed to enhance imaging. The use of bandpass filters, low noise amplifiers, mixers, and IF amplifiers may optionally be used prior to inputting into the ADC.

Figure 6:
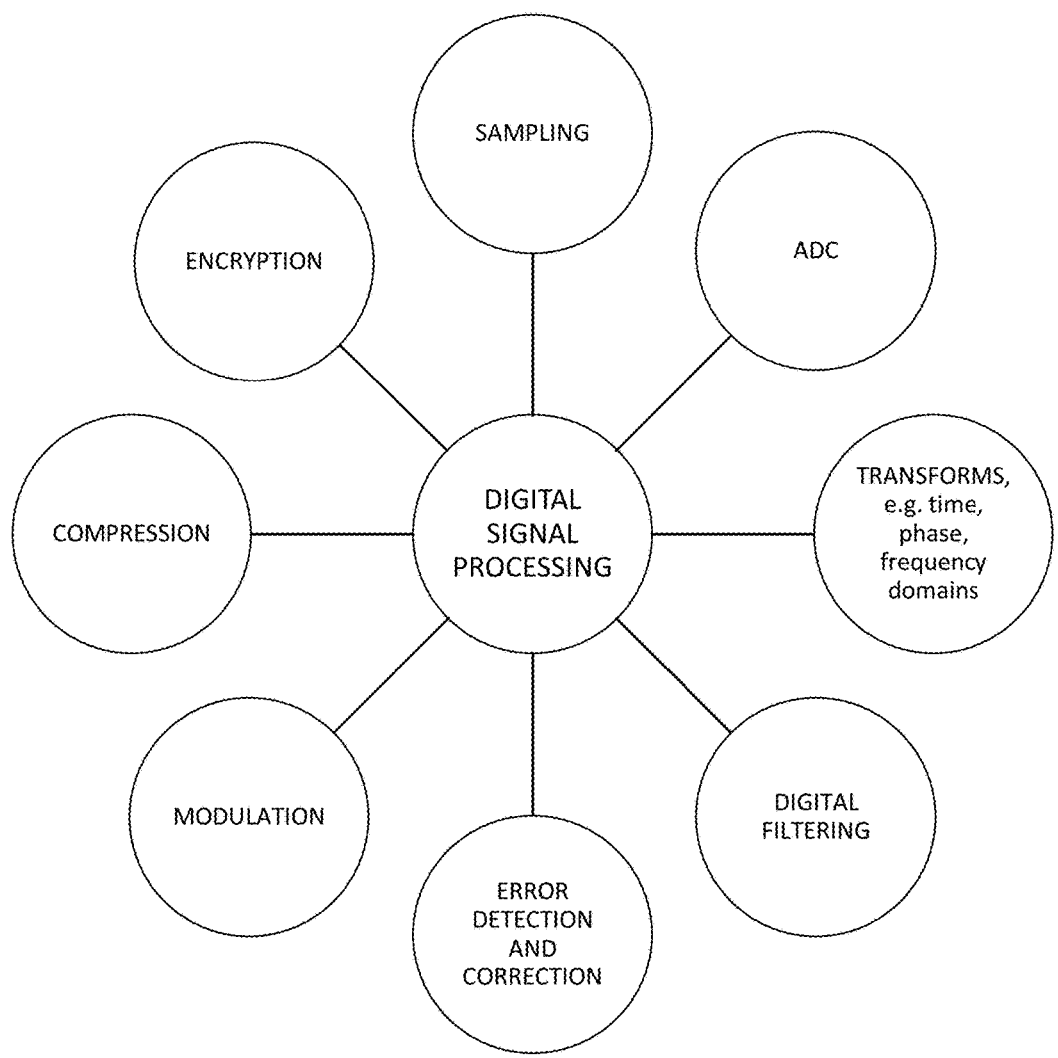
FIG. 6 is a diagram illustrating optional post-ADC signal processing of analog photon feed.

Referring now to FIG. 6, post-ADC standard EM digital signal processing actions are contemplated as within the scope of the invention. Example DSP processes include sampling, A-D and D-A conversion, use of transforms, digital filtering, error detection and correction, modulation, compression, and encryption.

Figure 7:
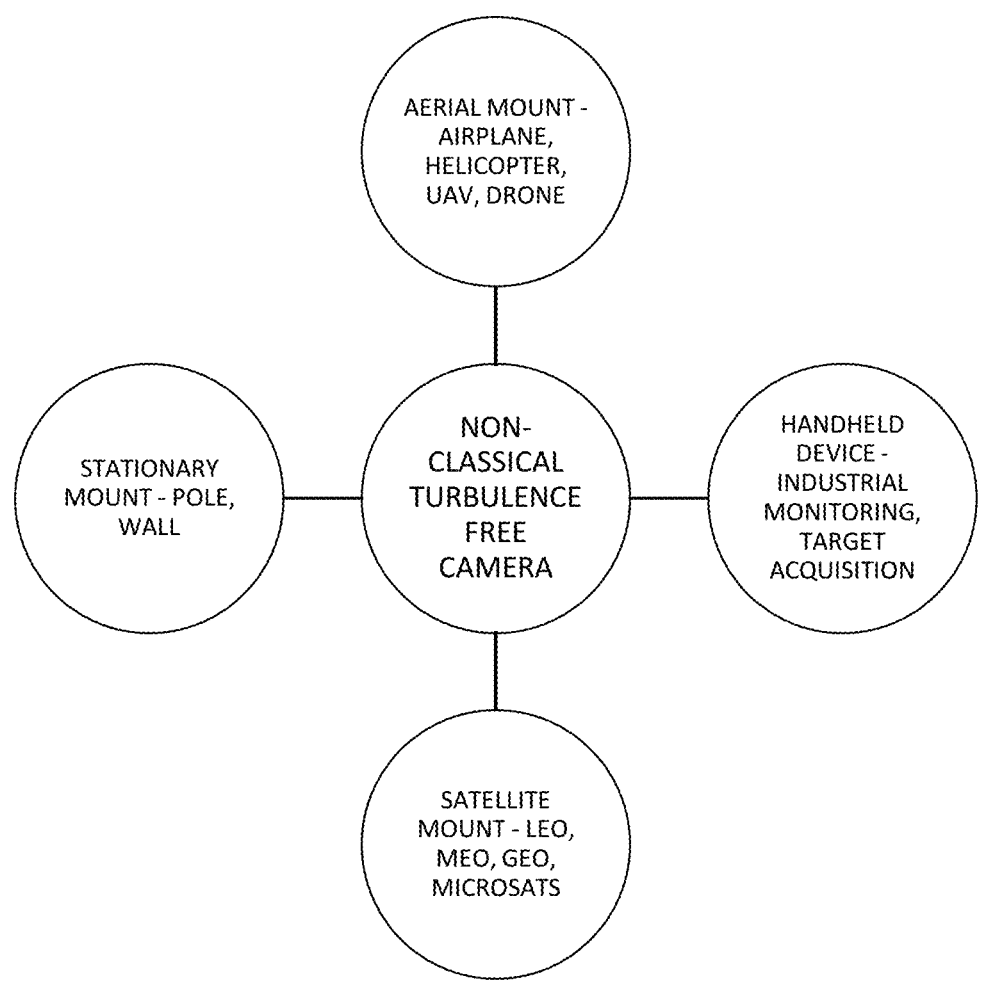
FIG. 7 is a graphic illustrating the camera platforms contemplated as within the scope of the invention.

Referring now to FIG. 7 is a graphic illustrating the camera platforms contemplated as within the scope of the invention. FIG. 7 includes aerial platforms including such non-limiting examples as airplanes, helicopters, unmanned aerial vehicle (UAV), drones. FIG. 7 includes stationary platforms including such non-limiting examples as pole-mounted camera systems, wall-mounted camera systems, and the like. FIG. 7 also illustrates that the invention includes satellite platforms including such non-limiting examples as Low Earth Orbit (LEO) usually 100-400 km and up top 2000 km satellite platforms, Medium Earth Orbit (MEO) between 2000 km to geostationary platforms, Geostationary Earth Orbit (GEO) around 36,000 km platforms, as well as shorter duration high altitude and microSAT platforms up to 100 km. FIG. 7 also illustrates that the invention includes handheld device platforms such as for industrial monitoring, long range target acquisition and surveillance, and portable applications.

Figure 8:
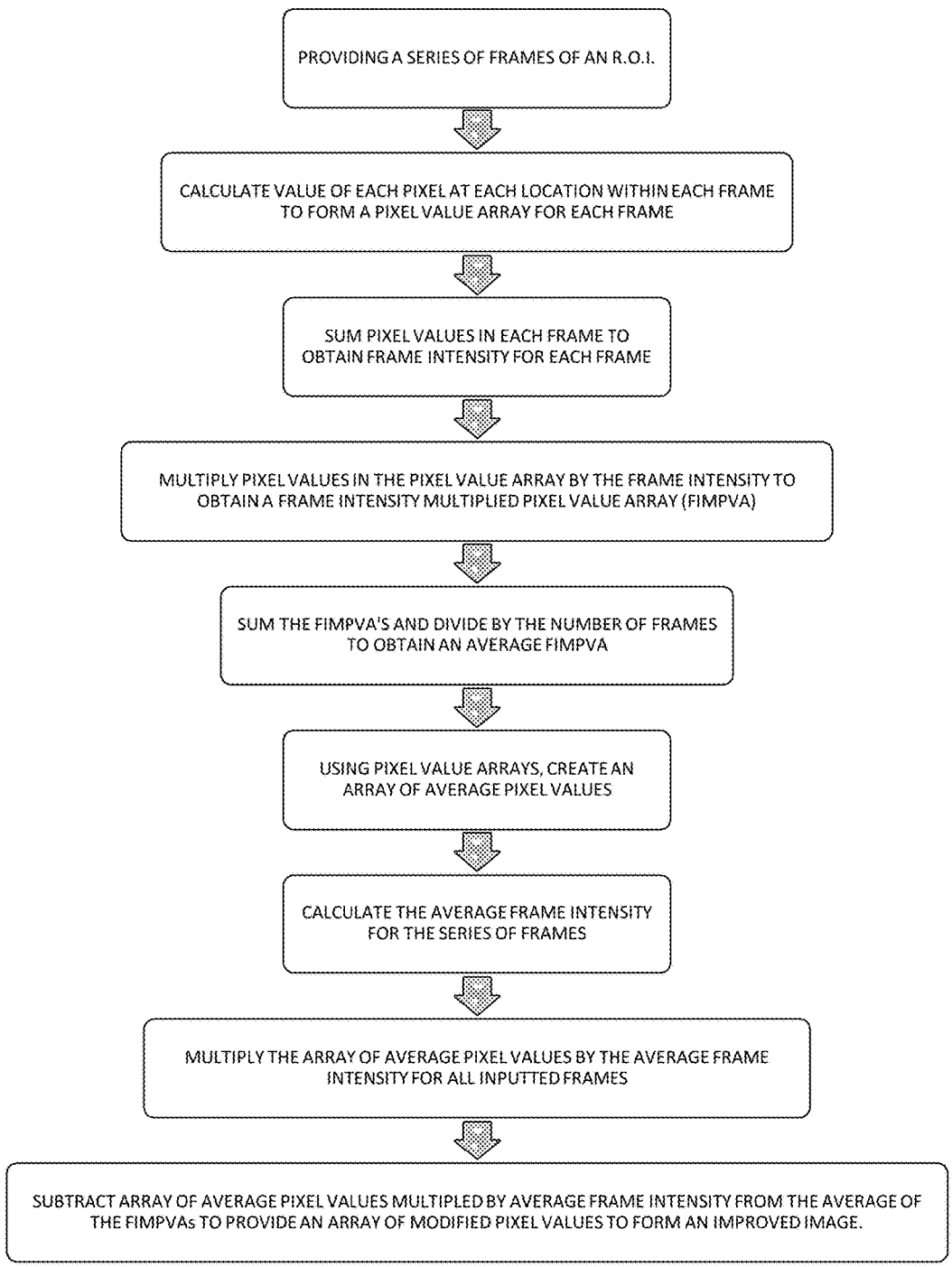
FIG. 8 is a flowchart illustrating post-acquisition pixel and frame processing to obtain an improved image using the non-classical camera disclosed herein.

FIG. 8 is a flowchart illustrating post-acquisition pixel and frame processing to obtain an improved image using the non-classical camera disclosed herein. FIG. 8 Steps include: providing a series of frames of a region of interest (ROI); Calculating the value at each pixel at each location within each frame to form a pixel value array for each frame; Summing pixel values in each frame to obtain a Frame Intensity (FI/F) for each Frame; Multiplying the Pixel Values in the Pixel Value Array by the Frame Intensity to obtain a Frame Intensity Multiplied Pixel Value Array (FIMPVA); Summing the FIMPVA's and dividing by the number of frames to obtain an average FIMPVA; Using the Pixel value Arrays and creating an Array of Average Pixel Values; Calculating the Average Frame Intensity for these Series of Frames; Multiplying the Array of Average Pixel Values by the Average Frame Intensity for All Inputted Frames; and Subtracting the [Array of Average Pixel Values Multiplied by the Average Frame Intensity] from the Average of the FIMPVAs to provide an Array of Modified Pixel Values to form an improved image.

In a preferred embodiment, the steps of FIG. 8 can be alternately described as comprising the steps of: (i) providing to the first fluctuation identifier a first sample set (S1) of a series of frames from the first photodetector, and providing to the second fluctuation identifier a second sample set (S2) of a series of frames from the second photodetector, wherein the first photodetector is frame synchronized with the second photodetector, each frame comprising a plurality of pixels, each pixel of the plurality of pixels having a pixel grid location (PGL) and a pixel intensity value (PIV); (ii) calculating an average pixel intensity value (av-PIV1) for each pixel in the first sample set (S1) by summing pixel intensity values (PIV1) of pixels having the same pixel grid location (PGL1) across the series of frames of the first sample set (S1), and calculating an average pixel intensity value (av-PIV2) for each pixel in the second sample set (S2) by summing pixel intensity values (PIV2) of pixels having the same pixel grid location (PGL2) across the series of frames of the second sample set (S2); (iii) calculating a pixel fluctuation (PF1) for each pixel in the first sample set by subtracting the pixel intensity value (PIV1) of each pixel from the average pixel intensity value (av-PIV1), and calculating a pixel fluctuation (PF2) for each pixel in the second sample set by subtracting the pixel intensity value (PIV2) of each pixel from the average pixel intensity value (av-PIV2); (iv) calculating a frame intensity (FI2) for each frame of the series of frames of the second sample set (S2) by summing the pixel fluctuations (PF2) in each frame; (v) calculating a frame intensity multiplied pixel intensity value (FIM-PIV1) for each pixel in the first sample set by multiplying the pixel fluctuation (PF1) for each pixel in each frame of the first sample set (S1) by the frame intensity (FI2) of each corresponding frame of the second sample set (S2); (vi) calculating a sample set frame average (FA1) by summing the frame intensity multiplied pixel intensity value (FIM-PIV1) of each frame of the series of frames of the first sample set (S1) and dividing by the number of frames in the first sample set (S1); and, (vii) calculating a modified pixel intensity value (m-PIV1) for each pixel from all inputted frames from the first photodetector by subtracting the sample set frame average (FA1) from pixel value intensity (PIV1) of pixels in all inputted frames to form a improved image.

Figure 9:
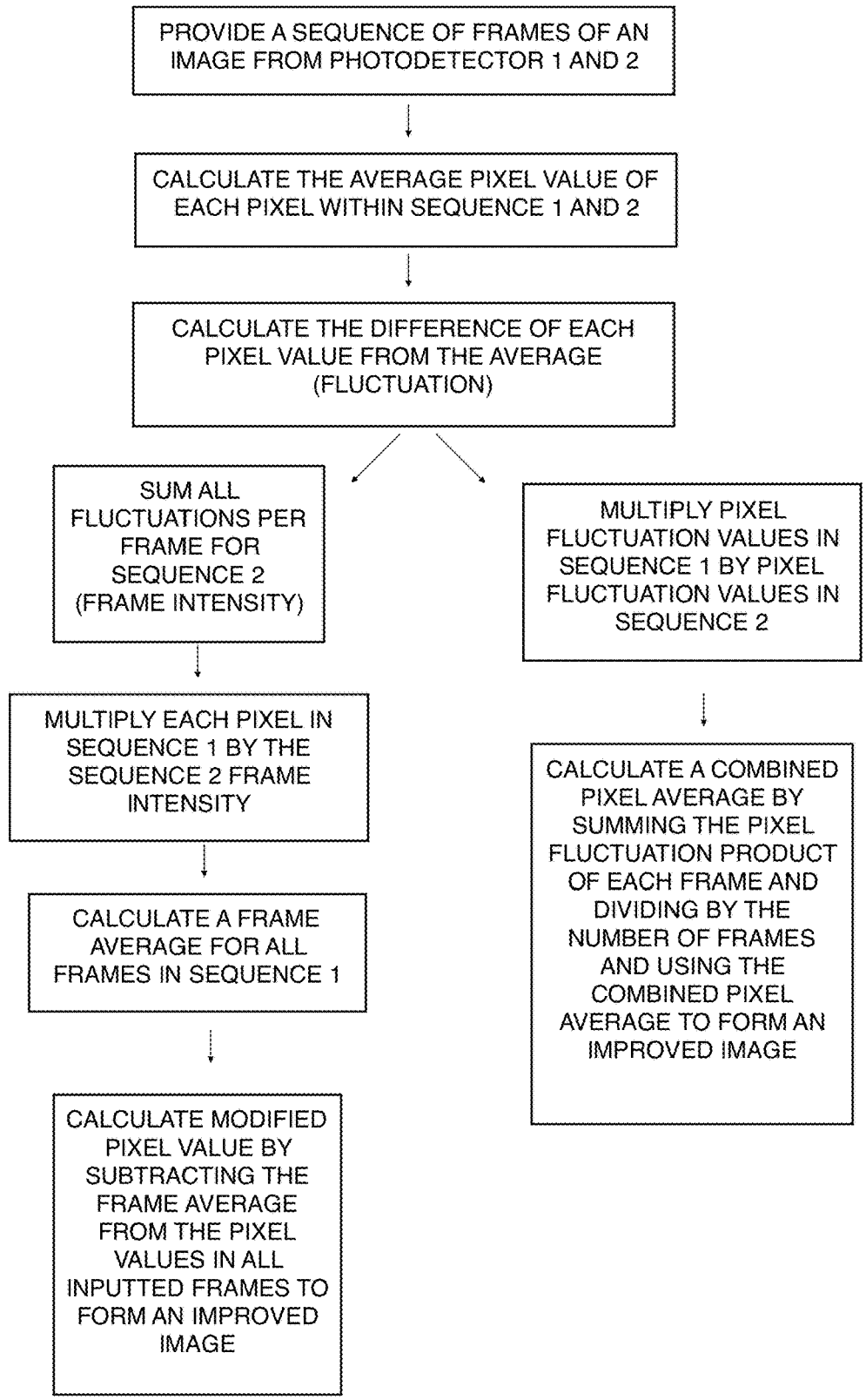
FIG. 9 is a flowchart illustrating processing steps for both the photodetector+bucket detector embodiment as well as the two photodetector embodiment.

FIG. 9 is a flowchart illustrating post-acquisition pixel and frame processing to obtain an improved image using the non-classical camera disclosed herein. FIG. 9 illustrates that two pathways can be used depending on the equipment used. In a camera system having a photodetector and a bucket detector, the left pathway illustrates the steps of one aspect of the invention. In a camera system having two photodetectors, the right pathway in FIG. 9 illustrates the steps of a preferred related aspect of the invention. FIG. 9 steps explain that a sequence of frames of an image from photodetector 1 and 2 are provided. Next, the average pixel value of each pixel within sequence 1 and 2 is calculated. The, the fluctuation intensity value is calculated by calculating the difference of each pixel value from the average of each pixel value across a series of frames. At this point, the processes diverge.

On the left side, the processor sums the fluctuations per frame for sequence 2 to obtain the frame intensity. Then, each pixel in sequence 1 is multiplied by the frame intensity value from sequence 2, on a frame by frame basis. Finally, the modified pixel value is obtained by subtracting the frame average from the pixels values in all inputted frames to form an improved image. In this way, the algorithm filters out noisy imaging and provides turbulence free high resolution imaging.

On the right side, the pixel fluctuation values in sequence 1 are multiplied by the pixel fluctuation values in sequence 2 to obtain fluctuation product. And finally, a combined average pixel value is calculated by summing the pixel fluctuation product of each frame and dividing by the number of frames, and then using this combined pixel array to form an improved image.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A camera system, comprising: a beam splitter receiving photons from an object or area to be imaged, each such photon passing through the beam splitter to a first photodetector or a second photodetector, wherein the first photodetector passes information to a first fluctuation identifier and the second photodetector passes information to a second fluctuation identifier and each of the first and second fluctuation identifiers pass information to a fluctuation circuit (FC) comprising at least one processor, at least one memory operatively associated with the processor, such memory containing a fluctuation protocol algorithm, and wherein the FC detects photon coincidence from the intensity fluctuation correlation of the photons, and passes the resulting correlation information to an image viewer, wherein each of the first and second photodetectors are selected from the group consisting of: a 100-214 THz (10e12 Hz) short-wave infrared photodetector (SWIR), a 120-400 THz near-IR infrared photodetector (NIR), a 30-120 THz mid-infrared photodetector (MIR), a 37-100 THz medium-wave infrared photodetector (MWIR), a 20-37 THz long-wave infrared photodetector (LWIR), a 0.3-30 THz FIR photodetector, a 300-750 THz visible wavelength photodetector (VIS), and a 700-30,000 THz ultraviolet wavelength photodetector (UV).

2. The camera system of claim 1 wherein each of the first and second photodetectors is selected from the type consisting of: a short-wave infrared photodetector (SWIR), a medium-wave infrared photodetector (MWIR), a long-wave infrared photodetector (LWIR), a visible wavelength photodetector (VIS), and a ultraviolet wavelength photodetector (UV).

3. The camera system of claim 1 wherein the short-wave infrared photodetector is selected from a detector consisting of: an InGaAs (Indium Gallium Arsinide) detector, a quantum dot film detector, a HgCdTe (Mercury Cadmium Telluride) detector, a Strained Layer Superlattice (SLS) detector, and a PbSe (Lead Selenium) detector.

4. The camera system of claim 1 wherein the medium-wave infrared photodetector is selected from a detector consisting of: an nBn (N-type Barrier N-type) detector, an InSb (Indium Tin) detector, a quantum dot film detector, a HgCdTe (Mercury Cadmium Telluride) detector, a Strained Layer Superlattice (SLS) detector, and a PbSe (Lead Selenium) detector.

5. The camera system of claim 1 wherein the long-wave infrared photodetector is selected from a detector consisting of: a HgCdTe (Mercury Cadmium Telluride) detector, and a Strained Layer Superlattice (SLS) detector.

6. The camera system of claim 1 wherein the visible-wavelength photodetector is selected from a detector consisting of: a silicon detector, and a quantum dot film detector.

7. The camera system of claim 1 wherein the ultraviolet-wavelength photodetector is a quantum dot film detector.

8. The camera system of claim 1 wherein the first photodetector and the second photodetector are the same type of photodetector.

9. The camera system of claim 1 wherein the first photodetector and the second photodetector are different types of photodetector.

10. The camera system of claim 1 wherein the first photodetector and the second photodetector are configured on a single photodetector film wherein the first photodetector is a first partition of the single photodetector film, and the second photodetector is a second partition of the single photodetector film.

11. The camera system of claim 1 wherein the information passed from the first photodetector and the second photodetector to the respective fluctuation identifier comprises the registration time of each photodetection event.

12. The camera system of claim 1, wherein the information passed from each fluctuation identifier to the fluctuation circuit comprises counting numbers classified as positive and negative fluctuations.

13. The camera system of claim 1 wherein the fluctuation circuit and associated circuit control and syncing software records the registration time of each photodetection event from the first photodetector and the second photodetector in two independent event timers, which are divided into sequences of short time windows.

14. The camera system of claim 12, wherein the fluctuation circuit and associated circuit control and syncing software analyzes the photon counting number fluctuations in each time window, calculating the average counting numbers per short time window.

15. The camera system of claim 1 having at least one FPGA (Field Programmable Gate Array) in control of the first and second photodetectors for synchronizing the information passed from the first photodetector to the first fluctuation identifier and the information passed from the second photodetector to the second fluctuation identifier.

16. The camera system of claim 1 having at least one ASIC (Application Specific Integrated Circuit) in control of the first and second photodetectors for synchronizing the information passed from the first photodetector to the first fluctuation identifier and the information passed from the second photodetector to the second fluctuation identifier.

17. The camera system of claim 1, wherein the photons are thermal light photons.

18. The camera system of claim 1, wherein the photons are reflected radiation photons.

19. The camera system of claim 1 wherein the path lengths of the photons incident on the first and second photodetectors are identical and provides turbulence free imaging.

20. The camera system of claim 1 wherein the path length of the photons incident on the first photodetector is at the image plane, and the path length of the photons incident on the second photodetectors at the Fourier plane and provides turbulence-free sub-Rayleigh imaging.

21. The camera system of claim 17 wherein the path length of the photons incident on the first and second photodetectors is achieved with mirrors or a high index of refraction material.

22. The camera system of claim 1 wherein the image produced on the image viewer is a series of images comprising a video sequence.

23. The camera system of claim 1 wherein the fluctuation protocol algorithm comprises programming steps configured for sequential execution on a processor, said steps comprising:
   a. providing to the first fluctuation identifier a first sample set (S1) of a series of frames from the first photodetector, and providing to the second fluctuation identifier a second sample set (S2) of a series of frames from the second photodetector, wherein the first photodetector is frame synchronized with the second photodetector, each frame comprising a plurality of pixels, each pixel of the plurality of pixels having a pixel grid location (PGL) and a pixel intensity value (PIV);
   b. calculating an average pixel intensity value (av-PIV1) for each pixel in the first sample set (S1) by summing pixel intensity values (PIV1) of pixels having the same pixel grid location (PGL1) across the series of frames of the first sample set (S1), and calculating an average pixel intensity value (av-PIV2) for each pixel in the second sample set (S2) by summing pixel intensity values (PIV2) of pixels having the same pixel grid location (PGL2) across the series of frames of the second sample set (S2);
   c. calculating a pixel fluctuation (PF1) for each pixel in the first sample set by subtracting the pixel intensity value (PIV1) of each pixel from the average pixel intensity value (av-PIV1), and calculating a pixel fluctuation (PF2) for each pixel in the second sample set by subtracting the pixel intensity value (PIV2) of each pixel from the average pixel intensity value (av-PIV2);
   d. calculating a frame intensity (FI2) for each frame of the series of frames of the second sample set (S2) by summing the pixel fluctuations (PF2) in each frame;
   e. calculating a frame intensity multiplied pixel intensity value (FIM-PIV1) for each pixel in the first sample set by multiplying the pixel fluctuation (PF1) for each pixel in each frame of the first sample set (S1) by the frame intensity (FI2) of each corresponding frame of the second sample set (S2);
   f. calculating a sample set frame average (FA 1) by summing the frame intensity multiplied pixel intensity value (FIM-PIV1) of each frame of the series of frames of the first sample set (S1) and dividing by the number of frames in the first sample set (S1); and,
   g. calculating a modified pixel intensity value (m-PIV1) for each pixel from all inputted frames from the first photodetector by subtracting the sample set frame average (FA1) from pixel value intensity (PIV1) of pixels in all inputted frames to form a improved image.

24. The camera system of claim 1, wherein the camera system is located on a satellite, airplane, helicopter, drone or other aerial vehicle.

* * * * *